United States Patent [19]

Jacobsson

[11] Patent Number: 5,077,942
[45] Date of Patent: Jan. 7, 1992

[54] VIBRATION DAMPED HAND HELD ROTARY GRINDING MACHINE

[75] Inventor: Rolf A. Jacobsson, Saltsjö-Boo, Sweden

[73] Assignee: Atlas Copco Tools AB, Stockholm, Sweden

[21] Appl. No.: 696,069

[22] Filed: May 6, 1991

[30] Foreign Application Priority Data

May 4, 1990 [SE] Sweden .............................. 9001621-3

[51] Int. Cl.⁵ ........................ B24B 23/00; B24B 55/04
[52] U.S. Cl. .................................. 51/170 R; 51/268
[58] Field of Search ............... 51/170 R, 169, 170 PT, 51/268, 170 MT, 170 T

[56] References Cited

FOREIGN PATENT DOCUMENTS 2826414 12/1979 Fed. Rep. of Germany ........ 51/268
0074564  4/1987 Japan .............................. 51/170 MT Primary Examiner—Roscoe V. Parker
Attorney, Agent, or Firm—Frishauf, Holtz, Goodman & Woodward

[57] ABSTRACT

A vibration damped hand held rotary grinding machine comprising a housing (10), a rotation motor (11), an output shaft (13) drivingly coupled to the motor and having a mounting (14) for attachment of a grinding wheel (15), two handles (17, 18) rigidly mounted on the housing (10) and extending in right angles relative to the output shaft (13) as well as to each other, and a sector-shaped non-resilient safe guard (19) which is rigidly attached to the housing (10) and surrounding partially the grinding wheel (15) and which has an arc-shaped rim portion (20) encircling partially the grinding wheel circumference. Vibration damping inertia elements (22, 23, 24) are rigidly attached to the safe guard (19) rim portion (20) and to the outer extremities of the handles (17, 18) such that the moment of inertia of the machine is substantially increased as is the vibration force absorption.

5 Claims, 1 Drawing Sheet

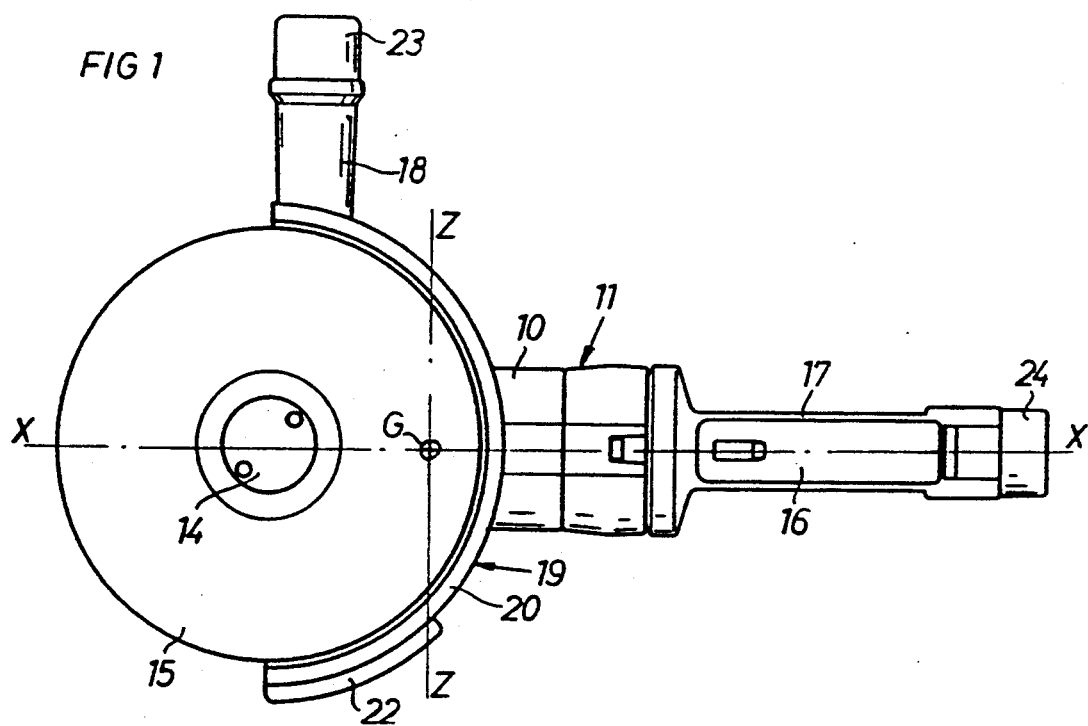
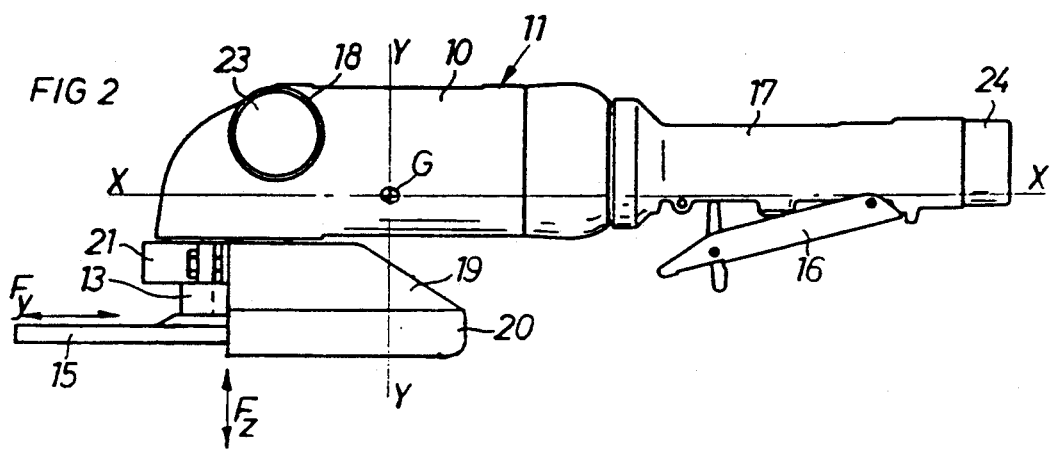
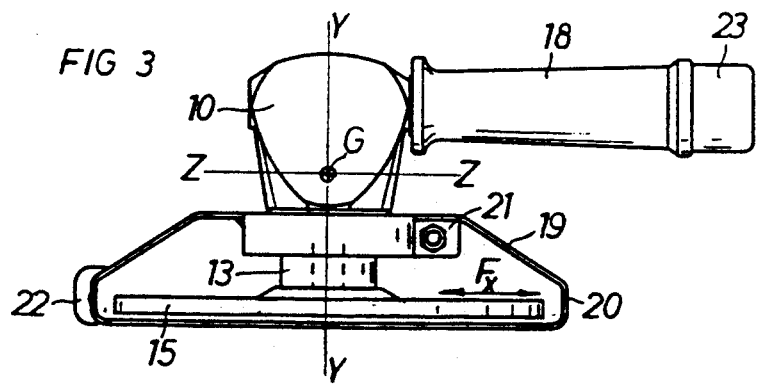

VIBRATION DAMPED HAND HELD ROTARY GRINDING MACHINE

BACKGROUND OF THE INVENTION

This invention concerns a vibration damped hand held rotary grinding machine, in particular a grinding machine of the above described type comprising a housing, a rotation motor, an output shaft drivingly coupled to the motor and having mounting means for attachment of a grinding wheel, two handles rigidly mounted on said housing and extending in substantially right angles relative to said output shaft as well as to each other, and a sector-shaped nonresilient safe guard which is rigidly attached to the housing and surrounding partially the grinding wheel and which has an arc-shaped rim portion encircling partially the grinding wheel circumference.

Vibrations developed in portable grinding machines of the above type emanate from the grinding wheel and are caused by an untrue or unbalanced running of the grinding wheel. This is due to a poor balancing of the grinding wheel at manufacturing, an inaccurate mounting on the tool shaft and to an uneven wear of the grinding wheel after some times use. Vibration forces are also generated at the contact between the grinding wheel and the work piece.

Accordingly, all vibration forces developed in the machine and to which the operator is exposed via the machine housing handles emanate from the grinding wheel and are transferred to the machine housing via the output shaft. Even if an accurate preuse balancing and centering of the grinding wheel were obtained there would still be vibration forces developed during grinding, which means that measures have to be taken to minimize the vibration forces transferred to the operator. There are two ways for lowering the vibration force transfer to the operator, namely:

(a) insulating the handles by resilient vibration absorbing means, and (b) employing means for absorbing the vibration forces, and, thereby, damping the vibrations in the machine housing.

Whereas a large variety of resilient vibration insulating handles for portable power tools have been used in the past, there are no examples in prior art of any effective vibration mitigating or damping means or of any measures taken to reduce substantially the vibrations in the machine housing.

The object of the invention is to accomplish an improved vibration damped hand held rotary grinding machine in which the vibration forces transferred to the machine housing via the output shaft are effectively counteracted and absorbed. This is obtained by changing the inertia characteristics of the machine.

Preferred embodiments of the invention are hereinafter described in detail with reference to the accompanying drawings.

BRIEF DESCRIPTION OF THE DRAWINGS

FIG. 1 shows a bottom view of a grinding machine according to the invention.

FIG. 2 side view of the grinding machine in FIG. I.

FIG. 3 a front end view of the grinding machine in FIG. 1.

DETAILED DESCRIPTION

The grinding machine shown in the drawing figures is of the angle grinder type in which the housing 10 supports a pneumatic rotation motor 11 which via an angle gear 12 rotates an output shaft 13. The latter carries a mounting device 14 by which a grinding wheel 15 of the depressed centre type is secured to the shaft 13.

Two handles 17, 18 are rigidly attached to the housing 10, one of which 17 is a straight extension of the housing 10 and comprises a pressure air supply passage and a throttle valve. A lever 16 is provided for manual control of the throttle valve. The other handle 18 is mounted in a right angle both to the output shaft 13 and to the throttle valve handle 17.

To the housing 10 there is also rigidly secured a grinding wheel safe guard 19 which encloses partially the grinding wheel 15. The rim portion 20 of the safe guard 19 extends over a 180° sector and, accordingly, it covers half the circumference of the grinding wheel 15. The safe guard 19 is secured to the housing 10 by means of a clamping device 21.

A vibration damping means in the form of an inertia element 22 is rigidly attached to the rim portion 20. This inertia element 22 is crest-shaped and is located to that part of the rim portion 20 which is located diametrically opposite the handle 18 as regards the geometric axis of the output shaft 13.

At the outer extremities of the handles 17, 18 there are rigidly mounted inertia elements 24 and 23, respectively.

The basic principle for the vibration damping arrangement according to the invention is that mass is added to the safe guard and to one or both of the handles 17, 18 in such a way that the moment of inertia of the machine is substantially increased in the critical direction or directions, i.e. the direction or directions in which the original moment of inertia of the machine is low and in which the vibration amplitude is large.

This goes for the moment of inertia relative to the length axis of the tool housing 10 and the handle 17, in particular. By adding inertia to one end part of the safe guard and to the handle 18, the moment of inertia about the length axis of the housing 10 is substantially increased.

To obtain an efficient vibration damping action by the inertia elements, it is of utmost importance that the safe guard 19 and the handles 17, 18 in themselves are very stiff and do not yield to the inertia forces to be transferred from the housing to the inertia elements 22, 23 and 24. It is also important that the inertia elements 22—24 are located at large radii relative to the length axis of the machine. Located at shorter radii, the inertia elements would add to the weight of the machine without really increasing the moment of inertia of the machine and, thereby, the vibration damping effect.

In FIGS. 2 and 3, there are illustrated vibration forces Fx, Fy and Fz which act in three perpendicular directions, and which cause vibratory movements of the machine housing 10 about three perpendicular geometric axes x, y, and z. From the different views shown in the drawing figures it is evident that the moment of inertia of the machine is lowest around the x-x axis, which means that the handle 18 is exposed to severe vibration movement in the vertical direction. However, this is substantially reduced by providing the inertia element 22 at the safe guard rim portion 20 and the inertia element 23 at the end of handle 18. The inertia element 22 and, in particular, inertia element 23 are located at large radii from the x axis, see FIG. 1, which means that the total moment of inertia of the machine is substantially increased.

It is to be noted that the machine illustrated in the drawing figures has a very high moment of inertia with reference to the Y- and Z-axes, which means that the inertia element 24 has a limited influence upon the total moment of inertia with reference to the Y- and Z-axes. Therefore, the most efficient way to increase the vibration damping moment of inertia of this type of machine for a certain added mass is to concentrate the added mass to the outer part of the safe guard 19 and to the outer extremity of handle 18.

For another type of grinding machine in which the motor is located coaxially with the output shaft, i.e. a machine without an angle gear, the moment of inertia about the x-axis is much lower, and the inertia element 24 would have a greater influence upon that moment of inertia.

I claim:

1. A hand held rotary grinding machine, comprising a housing, a rotation motor (11) an output shaft (13) drivingly coupled to said motor (11) and having mounting means (14) for attachment of a grinding wheel (15), two handles (17, 18) rigidly mounted on said housing (10) and extending in substantially right angles relative to said output shaft (13) as well as to each other, and a sector-shaped non-resilient safe guard (19) rigidly mounted on said housing (10) and surrounding partially said grinding wheel (15), said safe guard (19) having an arc-shaped rim portion (20) which encircles partially the grinding wheel circumference, wherein a first vibration damping inertia element (23) is rigidly attached to one of said handles (18), and a second vibration damping inertia element (22) is rigidly attached to that part of said safe guard rim portion (20) which is located substantially diametrically opposite said one handle (18) with regard to the geometric axis of said output shaft (13).

2. Grinding machine according to claim 1, wherein a third inertia element (24) is rigidly attached to the other of said two handles (17), which other handle (17) comprises power supply means connected to said motor (11).

3. Grinding machine according to claim 1 wherein said first inertia element (23) is located at the outer extremity of said one handle (18).

4. Grinding machine according to claim 1, wherein said second inertia element (22) is arc-shaped and extends along said rim portion part.

5. Grinding machine according to claim 2, wherein said first inertia element (23) is located at the outer extremity of said one handle (18).

* * * * *